(12) United States Patent
Abbott, Jr. et al.

(10) Patent No.: US 12,319,612 B2
(45) Date of Patent: Jun. 3, 2025

(54) SALT BATH COMPOSITIONS, SALT BATH SYSTEMS, AND PROCESSES FOR STRENGTHENING GLASS ARTICLES

(71) Applicant: CORNING INCORPORATED, Corning, NY (US)

(72) Inventors: John Steele Abbott, Jr., Horseheads, NY (US); Tonia Havewala Fletcher, Big Flats, NY (US); Sinue Gomez-Mower, Corning, NY (US); Kenneth Edward Hrdina, Horseheads, NY (US); Daniel Arthur Sternquist, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 951 days.

(21) Appl. No.: 17/198,600

(22) Filed: Mar. 11, 2021

(65) Prior Publication Data
US 2021/0292228 A1    Sep. 23, 2021

Related U.S. Application Data

(60) Provisional application No. 62/990,730, filed on Mar. 17, 2020.

(51) Int. Cl.
*C03C 21/00*    (2006.01)

(52) U.S. Cl.
CPC .................. *C03C 21/002* (2013.01)

(58) Field of Classification Search
None
See application file for complete search history.

(56) References Cited

U.S. PATENT DOCUMENTS

| | | | |
|---|---|---|---|
| 2,888,495 | A | 5/1959 | Kissling |
| 3,336,731 | A | 8/1967 | Phillips et al. |
| 3,385,759 | A | 5/1968 | Bettis et al. |
| 3,395,999 | A | 8/1968 | Lewek |
| 3,441,398 | A | 4/1969 | Hess |

(Continued)

FOREIGN PATENT DOCUMENTS

| | | |
|---|---|---|
| AU | 2013211472 B2 | 3/2016 |
| CN | 104310444 A | 1/2015 |

(Continued)

OTHER PUBLICATIONS

Araujo et al; "Ion Exchange Equilibria Between Glass and Molten Salts"; Journal of Non-Crystalline Solids; 318; pp. 262-267 (2003).

(Continued)

*Primary Examiner* — Jodi C Franklin
(74) *Attorney, Agent, or Firm* — Chandra J. Duncan

(57) ABSTRACT

Embodiments described herein are directed to compositions, systems, and processes for strengthening glass articles, which also minimize the concentration of decomposition products in the molten salt baths used in ion exchange processes to extend salt bath life and maintain the chemical durability of strengthened glass articles over time. The salt bath compositions may generally include from 90 wt. % to 99.9 wt. % of one or more alkali or metal salts and from 0.1 wt. % to 10 wt. % of silicic acid aggregates based on the total weight of the salt bath composition.

13 Claims, 9 Drawing Sheets

(56) References Cited

U.S. PATENT DOCUMENTS

| | | | |
|---|---|---|---|
| 3,711,393 A | 1/1973 | Garfinkel | |
| 3,730,871 A | 5/1973 | Boffe | |
| 3,879,274 A * | 4/1975 | Matsumori | C03C 21/001 205/85 |
| 3,933,127 A | 1/1976 | Arps | |
| 4,689,146 A | 8/1987 | Kasai et al. | |
| 5,015,288 A | 5/1991 | Kusik et al. | |
| 5,039,631 A * | 8/1991 | Krashkevich | C03C 3/095 501/78 |
| 5,077,240 A * | 12/1991 | Hayden | C03C 21/002 501/55 |
| 5,846,278 A | 12/1998 | Jantzen et al. | |
| 6,190,548 B1 | 2/2001 | Frick | |
| 6,436,858 B1 * | 8/2002 | Laborde | C03C 23/007 501/67 |
| 6,534,120 B1 * | 3/2003 | Ozawa | G11B 5/8404 427/127 |
| 7,419,530 B2 | 9/2008 | De Vries et al. | |
| 8,551,898 B2 | 10/2013 | Danielson et al. | |
| 8,834,806 B2 | 9/2014 | Mizrahi | |
| 8,956,424 B2 | 2/2015 | Yang | |
| 8,980,777 B2 | 3/2015 | Danielson et al. | |
| 10,202,300 B2 | 2/2019 | Hart et al. | |
| 10,556,826 B2 | 2/2020 | Amin et al. | |
| 2003/0110802 A1 * | 6/2003 | Jensen | C03C 21/002 65/30.14 |
| 2005/0181931 A1 | 8/2005 | Mouri et al. | |
| 2005/0284179 A1 * | 12/2005 | Isono | C03C 21/002 65/61 |
| 2009/0050576 A1 * | 2/2009 | Gement | C02F 1/76 210/192 |
| 2009/0241731 A1 | 10/2009 | Pereira et al. | |
| 2011/0293942 A1 * | 12/2011 | Cornejo | C03C 3/083 65/355 |
| 2012/0196110 A1 * | 8/2012 | Murata | C03C 21/00 428/220 |
| 2012/0210749 A1 * | 8/2012 | Feng | G02B 1/12 977/773 |
| 2013/0061636 A1 * | 3/2013 | Imai | C03C 21/002 65/30.14 |
| 2013/0202715 A1 * | 8/2013 | Wang | C03C 4/00 424/618 |
| 2013/0219965 A1 | 8/2013 | Allan et al. | |
| 2014/0366579 A1 * | 12/2014 | Antoine | C03C 21/002 65/157 |
| 2015/0152344 A1 | 6/2015 | Gueh | |
| 2016/0039587 A1 | 2/2016 | Wetherill | |
| 2016/0200629 A1 | 7/2016 | Ikawa et al. | |
| 2017/0197869 A1 * | 7/2017 | Beall | C03C 3/097 |
| 2017/0282503 A1 | 10/2017 | Peng et al. | |
| 2017/0295657 A1 * | 10/2017 | Gross | C03C 21/002 |
| 2017/0305788 A1 | 10/2017 | Nikulin | |
| 2018/0057402 A1 * | 3/2018 | Hu | C03C 21/002 |
| 2018/0148373 A1 | 5/2018 | Harris et al. | |
| 2018/0327305 A1 * | 11/2018 | Amin | C03C 21/002 |
| 2018/0362399 A1 | 12/2018 | Amin et al. | |
| 2019/0062207 A1 * | 2/2019 | Jin | C11D 7/08 |
| 2019/0127265 A1 * | 5/2019 | Dejneka | C03C 21/002 |
| 2020/0102244 A1 | 4/2020 | Li et al. | |
| 2020/0171478 A1 | 6/2020 | Bernard et al. | |
| 2020/0172434 A1 * | 6/2020 | Dafin | C03C 21/002 |
| 2021/0198141 A1 * | 7/2021 | Lee | C03C 21/002 |
| 2021/0300817 A1 * | 9/2021 | Kobayashi | C09D 5/1625 |
| 2022/0081357 A1 * | 3/2022 | Gomez-Mower | C03C 21/001 |
| 2022/0281769 A1 * | 9/2022 | Sekiya | C03C 3/083 |
| 2023/0312410 A1 * | 10/2023 | Voland | C03C 21/002 65/30.14 |

FOREIGN PATENT DOCUMENTS

| | | | | |
|---|---|---|---|---|
| CN | 104445293 A | | 3/2015 | |
| CN | 105555730 A | | 5/2016 | |
| CN | 105593177 A | | 5/2016 | |
| CN | 106629785 A | | 5/2017 | |
| CN | 107108305 A | | 8/2017 | |
| CN | 107207315 A | | 9/2017 | |
| CN | 107311205 A | | 11/2017 | |
| CN | 108975667 A | * | 12/2018 | |
| CN | 110342834 A | | 10/2019 | |
| CN | 209612365 U | * | 11/2019 | |
| JP | 2015-151315 A | | 8/2015 | |
| JP | 6273816 B2 | | 2/2018 | |
| WO | 2014/045977 A1 | | 3/2014 | |
| WO | 2014/045979 A1 | | 3/2014 | |
| WO | 2015/080095 A1 | | 6/2015 | |
| WO | WO-2017087742 A1 | * | 5/2017 | B01J 39/02 |

OTHER PUBLICATIONS

Arthur "An investigation into the thermophysical and rheological properties of nanofluids for solar thermal applications" Renewable and Sustainable Energy Reviews 55 (2016) 739-755.

Bartholomew "A Study of the Equilibrium $KNO_3(l) \Leftrightarrow KNO_2(l) + 1/2O_2$ (g) Over the Temperature Range 550-750°" J. Phys. Chem. (1966) 3442-3446.

Freeman "The Kinetics of the Thermal Decomposition of Sodium Nitrate and of the Reaction Between Sodium Nitrite and Oxygen" J. Phys. Chem. 60(11) 1487-1493.

Freeman "The Kinetics of Thermal Decomposition of Potassium Nitrate and of the Reaction Between Potassium Nitrate and Oxygen" J. Am. Chem. Soc. (Feb. 20, 1957) 838-842.

Kramer "Differential Scanning Calorimetry of Sodium and Potassium Nitrates and Nitrites" Thermochimica Acta 55 (1982) 11-17.

Lindauer et al, "Design Construction and Testing of a Large Molten Salt Filter", Oak Ridge National Laboratory (1969).

McCabe et al., "Unit Operations in Chemical Engineering" Fourth Edition 1985 pp. 749-758.

Xiao-Fu et al., "Separation of sodium and potassium using adsorption—elution/crystallization scheme from bittern", Chemical Engineering Research and Design, vol. 161, 2020, pp. 72-81.

International Search Report and Written Opinion of the International Searching Authority; PCT/US2021/019344; dated Jun. 24, 2021; 10 pages; European Patent Office.

* cited by examiner

SALT BATH COMPOSITIONS, SALT BATH SYSTEMS, AND PROCESSES FOR STRENGTHENING GLASS ARTICLES

CROSS-REFERENCE TO RELATED APPLICATIONS

This application claims the benefit of priority under 35 U.S.C. § 119 of U.S. Provisional Application Ser. No. 62/990,730 filed on Mar. 17, 2020, the content of which is relied upon and incorporated herein by reference in its entirety.

TECHNICAL FIELD

The present specification generally relates to methods for chemically strengthening glass articles and, more particularly, to salt bath compositions, salt bath systems, and processes for strengthening glass articles.

BACKGROUND

Tempered or strengthened glass may be used in a variety of applications. For example, strengthened glass may be used in consumer electronic devices, such as smart phones and tablets, because of its physical durability and resistance to breakage. Strengthened glass may also be used in pharmaceutical packaging. In such applications, the chemical durability of the glass, in addition to the physical durability, is important to prevent contamination of the contents of the pharmaceutical package. However, conventional strengthening processes, such as conventional ion exchange processes, may decrease the chemical durability of the glass. This may be caused, at least in part, by the degradation and/or decomposition of the molten salt baths utilized for ion exchange.

Accordingly, a need exists for alternative salt bath compositions for strengthening glass articles.

SUMMARY

According to a first aspect, salt bath composition for strengthening glass articles includes from 90 wt. % to 99.9 wt. % of one or more alkali metal salts based on the total weight of the salt bath composition; and from 0.1 wt. % to 10 wt. % of silicic acid aggregates based on the total weight of the salt bath composition, wherein the silicic acid aggregates have an average size of from 50 µm to 200 µm.

A second aspect includes the salt bath composition of the first aspect, wherein at least 50% of the silicic acid aggregates have an average size less than or equal to 200 µm.

A third aspect includes the salt bath composition of the either of the first or second aspects, wherein at least 50% of the silicic acid aggregates have an average particle size greater than or equal to 50 µm.

A fourth aspect includes the salt bath composition of any of the first through third aspects, wherein a specific surface area of the silicic acid aggregates is greater than or equal to 200 m²/g.

A fifth aspect includes the salt bath composition of any of the first through fourth aspects, wherein the one or more alkali metal salts comprise potassium nitrate, sodium nitrate, lithium nitrate, or combinations of these.

According to a sixth aspect, salt bath system for strengthening glass article includes a salt bath tank defining an interior volume enclosed by at least one sidewall; and a salt bath composition within the interior volume and comprising: from 90 wt. % to 99.5 wt. % of one or more alkali or alkaline earth metal salts based on the total weight of the salt bath composition; and from 0.1 wt. % to 10 wt. % of silicic acid aggregates based om the total weight of the salt bath composition, wherein the silicic acid aggregates have an average size of from 50 µm to 400 µm.

A seventh aspect includes the salt bath system of the sixth aspect, wherein the system further comprises one or more sieves coupled to the sidewall, wherein at least a portion of the silicic acid aggregates are contained within the one or more sieves.

An eighth aspect includes the salt bath system of the seventh aspect, wherein the one or more sieves have a mesh number greater than or equal to 70.

A ninth aspect includes the salt bath system of either of the seventh or eighth aspects, wherein the portion of the silicic acid aggregates comprises from 25% to 80% of a total amount of the silicic acid aggregates.

A tenth aspect includes the salt bath system of any of the sixth through ninth aspects, wherein the system further comprises an agitator.

An eleventh aspect includes the salt bath system of the tenth aspect, wherein the agitator comprises a stirrer.

A twelfth aspect includes the salt bath system of the tenth aspect, wherein the agitator comprises a gas injection system.

A thirteenth aspect includes the salt bath system of any of the sixth through twelfth aspects, wherein the silicic acid aggregates have an average size of from 50 µm to 200 µm.

A fourteenth aspect includes the salt bath system of any of the sixth through twelfth aspects, wherein the silicic acid aggregates have an average size of from 200 µm to 400 µm.

A fifteenth aspect includes the salt bath system of any of the sixth through fourteenth aspects, wherein at least 50% of the silicic acid aggregates have an average size less than or equal to 400 µm.

A sixteenth aspect includes the salt bath system of any of the sixth through fifteenth aspects, wherein at least 50% of the silicic acid aggregates have an average size greater than or equal to 50 µm.

A seventeenth aspect includes the salt bath system of any of the sixth through sixteenth aspects, wherein an average surface area of the silicic acid aggregates is greater than or equal to 200 m²/g.

An eighteenth aspect includes the salt bath system of any of the sixth through seventeenth aspects, wherein the one or more alkali metal salts comprise potassium nitrate, sodium nitrate, lithium nitrate, or combinations of these.

According to a nineteenth aspect, a process of strengthening glass articles includes heating a salt bath composition to an ion exchange temperature to form a molten salt bath composition, the salt bath composition comprising one or more alkali or alkaline earth metal salts: circulating the molten salt bath composition through a neutralization zone comprising silicic acid aggregates, the silicic acid aggregates having an average size of from 50 µm to 400 µm; and submerging a glass article into the molten salt bath composition such that an ion exchange between the molten salt bath composition and the glass article occurs.

A twentieth aspect includes the process of the nineteenth aspect, wherein the neutralization zone comprises a packed bed of the silicic acid aggregates.

A twenty-first aspect includes the process of the twentieth aspect, wherein the packed bed is enclosed by a sieve having a mesh number greater than or equal to 70.

A twenty-second aspect includes the process of any of the nineteenth through twenty-first aspects, wherein the salt bath composition is circulated through the neutralization zone at a rate of from 0.05 vol/hr to 10 vol/hr.

A twenty-third aspect includes the process of any of the nineteenth through twenty-second aspects, wherein at least 50% of the silicic acid aggregates have an average size less than or equal to 400 μm.

A twenty-fourth aspect includes the process of any of the nineteenth through twenty-third aspects, wherein at least 50% of the silicic acid aggregates have an average size greater than or equal to 50 μm.

A twenty-fifth aspect includes the process of any of the nineteenth through twenty-fourth aspects, wherein an average surface area of the silicic acid aggregates is greater than or equal to 200 m$^2$/g.

A twenty-sixth aspect includes the process of any of the nineteenth through twenty-fifth aspects, wherein the one or more alkali metal salts comprise potassium nitrate, sodium nitrate, lithium nitrate, or combinations of these.

A twenty-seventh aspect includes the process of any of the nineteenth through twenty-sixth aspects, wherein the salt bath composition comprises from 90 wt % to 99.5 wt. % of the one or more alkali or alkaline earth metal salts based on the total weight of the salt bath composition.

A twenty-eighth aspect includes the process of any of the nineteenth through twenty-seventh aspects, wherein the neutralization zone comprises from 0.1 wt. % to 10 wt. % based on the total weight of the salt bath composition.

According to a twenty-ninth aspect, a process of loading a salt bath composition for strengthening glass articles includes adding a first solid layer comprising one or more alkali metal salts to a salt bath tank: adding a second solid layer comprising silicic acid aggregates to the salt bath tank; and adding a third solid layer comprising one or more alkali metal salts to the salt bath tank such that the second solid layer comprising silicic acid aggregates is positioned between the first solid layer and the second solid layer, wherein the sum of a weight percent of the first solid layer and a weigh percent of the third solid layer is from 90 wt. % to 99.5 wt. % of the salt bath composition; and wherein the ratio of the weight percent of the first solid layer to the weight percent of the third solid layer is from 1:4 to 4:1.

A thirtieth aspect includes the process of the twenty-ninth aspect, wherein the weight percent of the second solid layer is from 0.5 wt. % to 10 wt. % based on the total weight of the salt bath composition.

A thirty-first aspect includes the process of either of the twenty-ninth or thirtieth aspects, wherein the process further comprises heating the first solid layer, the second solid layer, and the third solid layer to form a molten salt bath.

A thirty-second aspect includes the process of the thirty-first aspect, wherein the first layer, the second solid layer, and the third solid layer are heated to a temperature of from 350° C. to 500° C.

A thirty-third aspect includes the process of any of the twenty-ninth through thirty-second aspects, wherein the silicic acid aggregates have an average size of from 50 μm to 400 μm.

A thirty-fourth aspect includes the process of any of the twenty-ninth through thirty-third aspects, wherein at least 50% of the silicic acid aggregates have an average size less than or equal to 400 μm.

A thirty-fifth aspect includes the process of any of the twenty-ninth through thirty-fourth aspects, wherein at least 50% of the silicic acid aggregates have an average size greater than or equal to 50 μm.

A thirty-sixth aspect includes the process of any of the twenty-ninth through thirty-fifth aspects, wherein an average surface area of the silicic acid aggregates is greater than or equal to 200 m$^2$/g.

A thirty-seventh aspect includes the process of any of the twenty-ninth through thirty-sixth aspects, wherein the one or more alkali metal salts comprise potassium nitrate, sodium nitrate, magnesium nitrate, calcium nitrate, or combinations of these.

According to a thirty-eighth aspect, a process of strengthening glass articles includes heating a salt bath composition to an ion exchange temperature to form a molten salt bath composition, the salt bath composition comprising one or more alkali or alkaline earth metal salts: submerging a glass article into the molten salt bath composition such that an ion exchange between the molten salt bath composition and the glass article occurs: contacting the molten salt bath composition with silicic acid aggregates, the silicic acid aggregates having an average size of from 50 μm to 400 μm; and submerging a second glass article into the molten salt bath composition such that an ion exchange between the molten salt bath composition and the second glass article occurs.

A thirty-ninth aspect includes the process of the thirty-eighth aspect, further comprising contacting the molten salt bath composition with silicic acid aggregates a second time, the silicic acid aggregates having an average size of from 50 μm to 400 μm; and submerging a third glass article into the molten salt bath composition such that an ion exchange between the molten salt bath composition and the third glass article occurs.

A fortieth aspect includes the process of either the thirty-eighth or thirty-ninth aspects, wherein the glass article is removed from the molten salt bath prior to contacting the molten salt bath composition with silicic acid aggregates.

Additional features and advantages of the compositions, methods, and articles described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
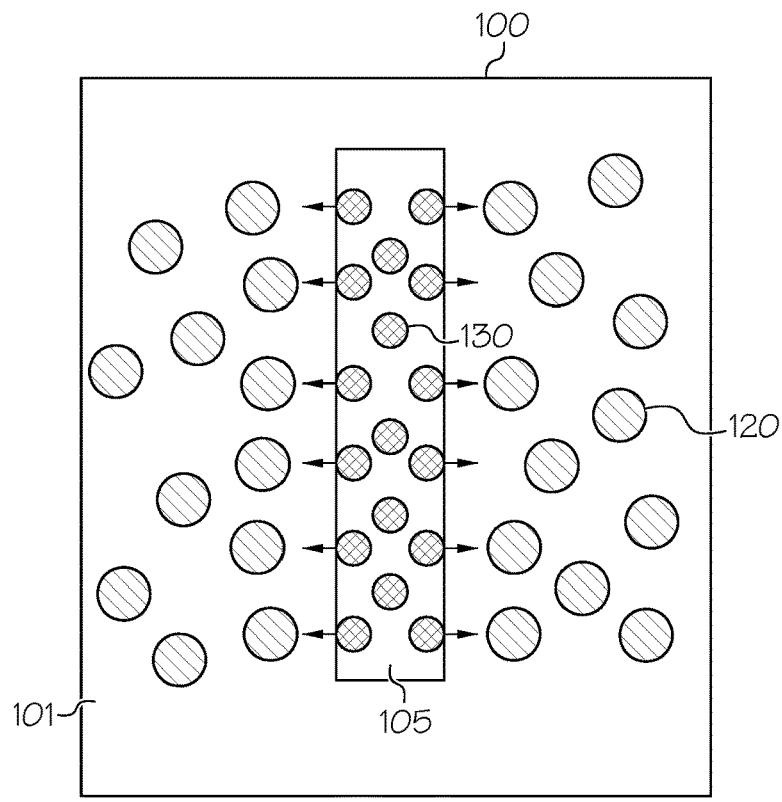
FIG. 1A schematically depicts a portion of an ion exchange process, according to one or more embodiments shown and described herein.

Embodiments described herein are directed to compositions, systems, and processes for strengthening glass articles, while also minimizing the concentration of decomposition products in the molten salt baths used in ion exchange processes to extend salt bath life and maintain the chemical durability of strengthened glass articles over time. The salt bath compositions may generally include from 90 wt. % to 99.9 wt. % of one or more alkali or metal salts and from 0.1 wt. % to 10 wt. % of silicic acid aggregates based on the total weight of the salt bath composition. Various embodiments of the compositions, systems, and processes will be described herein with specific reference to the appended drawings.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components: plain meaning derived from grammatical organization or punctuation, and: the number or type of embodiments described in the specification.

As used herein, the terms "ion exchange bath," "salt bath," and "molten salt bath," are, unless otherwise specified, equivalent terms, and refer to the solution or medium used to effect the ion exchange process with a glass (or glass-ceramic) article, in which cations within the surface of a glass article are replaced or exchanged with cations that are present in the salt bath. It is understood that a salt bath may include at least one alkali metal salt, such as potassium nitrate ($KNO_3$) and/or sodium nitrate ($NaNO_3$), which may be liquefied by heat or otherwise heated to a substantially liquid phase.

As used herein, the term "chemical durability" refers to the ability of the glass composition to resist degradation upon exposure to specified chemical conditions. Specifically, the chemical durability of the glass articles described herein was assessed in water according to the "Surface Glass Test" of USP <660> "Containers—Glass".

As used herein, the singular forms "a," "an," and "the" include plural referents unless the context clearly dictates otherwise. Thus, for example, reference to "a" component includes aspects having two or more such components, unless the context clearly indicates otherwise.

Figure 1B:
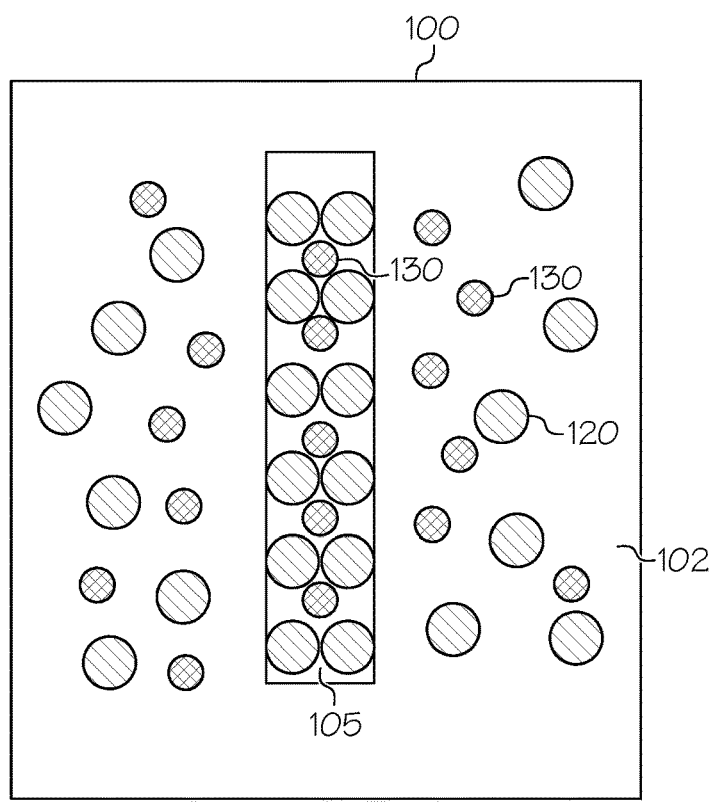
FIG. 1B schematically depicts a portion of an ion exchange process, according to one or more embodiments shown and described herein.

Referring initially to FIGS. 1A and 1B, a conventional ion exchange process is schematically depicted. The ion exchange process includes immersing a glass article 105 in a salt bath 100. In embodiments, the glass article 105 may comprise a silicate glass, such as a borosilicate glass or an aluminosilicate glass, that meets the Type I glass criteria, as described by the United States Pharmacopeia (USP)<660> "Containers—Glass". Type I glass generally has a relatively high hydrolytic resistance and a relatively high thermal shock resistance. In embodiments, the glass article 105 may comprise a Type III glass, which is also described by USP <660>. Type III glass is generally a soda-lime-silica glass. Type III glass has a moderate hydrolytic resistance. In embodiments, the glass article 105 may comprise a Type II glass, which is also described by USP <660>. Type II glass is generally a Type III glass that has been exposed to a surface treatment to improve the hydrolytic resistance of the glass.

Referring still to FIG. 1A, the glass article 105 may contain relatively smaller cations 130, for example, alkali metal cations such as $Li^+$ and/or $Na^+$ cations. The salt bath 100 may include a molten salt 101 containing relatively larger cations 120 (i.e., relative to the cations 130 of the glass article) at an elevated temperature. That is, the larger cations 120 may have an atomic radius larger than an atomic radius of the smaller cations 130. The larger cations 120 may include, for example, alkali metal cations, such as potassium ($K^+$) and/or sodium ($Na^+$) cations. The larger cations 120 may have disassociated from a salt, such as an alkali metal nitrate, present in the salt bath 100 when heated to the elevated temperature of the molten salt 101. When the glass article 105 is immersed in the salt bath 100, the smaller cations 130 within the glass article 105 may diffuse from the glass article 105 and into the molten salt 101. Referring now to FIG. 1B, the larger cations 120 from the molten salt 101 may replace the smaller cations 130 in the glass article 105 after such diffusion. This substitution of the larger cations 120 for the smaller cations 130 in the glass article 105 creates a surface compressive stress (CS) at the surface of the glass article 105 which extends to a depth of layer (DOL), which in turn may increase the mechanical strength of the glass article 105 and improve the resistance of the glass article 105 to breakage.

It has been found that, during an ion exchange process, metal nitrates present in the salt bath, such as an alkali metal nitrate, may decompose into metal nitrites and/or metal oxides. For example, the decomposition of an alkali metal nitrate into an alkali metal nitrite is indicated in the following equation:

$$MNO_3 \leftrightarrow MNO_2 + \tfrac{1}{2}O_2 \text{ [M: IUPAC Group 1 Metal]}$$

Both alkali metal nitrates and alkali metal nitrites may further decompose into alkali metal oxides, as indicated in the following equation:

$$MNO_2 \leftrightarrow M_2O + NO_x \text{ [M: IUPAC Group 1 Metal]}$$

For example, in instances where potassium nitrate ($KNO_3$) salt is present in the salt bath, it has been found that the $KNO_3$ decomposes into two primary decomposition products at bath temperatures greater than about 400° C.: potassium nitrite ($KNO_2$) and potassium oxide ($K_2O$). It has been found that other alkali metal nitrates, such as sodium nitrate and lithium nitrate, may decompose into the corresponding alkali metal nitrites and alkali metal oxides at temperatures lower than $KNO_3$ (i.e., temperatures less than or equal to 400° C.).

It has been determined that the presence of alkali metal oxides, such as $K_2O$, in a salt bath may degrade the properties of the glass articles treated therein. In particular, it has been found that alkali metal oxides in the salt bath may incongruently etch the surface of glass articles during ion exchange. This etching may degrade the surface of the glass article, which may, in turn, adversely impact a number of properties of the glass article. For example, it has been found that glass articles which undergo ion exchange in salt baths that include concentrations of $K_2O$ greater than or equal to 0.5 wt. % may form visible etching and surface damage on the glass articles. Even when glass articles undergo ion exchange in salt baths which include concentrations of $K_2O$ less than 0.5 wt. %, it has been found that the presence of $K_2O$ may result in a substantial decrease in the mechanical strength of the glass articles.

The degradation of the surface of glass articles during ion exchange may be reduced or prevented by the neutralization of the salt bath. That is, the degradation of the surface of glass articles during ion exchange may be reduced or prevented by a reduction or elimination of the alkali metal oxides present within the salt bath. This may be achieved, at least in part, by the inclusion of silicic acid within the salt bath. As used herein, the term "silicic acid" may refer to silicic acids, such as orthosilicic acid ($Si(OH)_4$), as well as the corresponding silicates, which are the conjugate bases of silicic acids. Silicic acids generally react with alkali metal oxides to form an unreactive product, as indicated in the following equation:

$$M_2O + SiO_2 \rightarrow M_2SiO_3 \text{ [M: IUPAC Group 1 Metal]}$$

Without being bound by any particular theory, it is believed that the Surface Hydrolytic Resistance (SHR) of a glass article that has been ion exchanged in a salt bath may be the most reliably discerning metric for determining the extent to which the salt bath is neutralized. The Surface Hydrolytic Resistance of a glass article may be measured by the Surface Glass Test, as detailed in USP <660>. When measuring the Surface Hydrolytic Resistance of a glass article with the Surface Glass Test, a glass vial or container composed of the glass article is filled with carbon dioxide-free or purified water. The filled vial or container is then subjected to an autoclave cycle at approximately 121° C. for approximately 1 hour. The resulting leachate within the vial or container is then titrated to neutral by a weak hydrochloric acid (e.g., 0.01 M HCl) in the presence of methyl red. The volume of titrant per 100 mL of leachate is used to determine the Surface Hydrolytic Resistance of the glass article. Generally, a greater a titrant volume corresponds to an inferior chemical durability (that is, the leachate contains more glass components released by the glass and thus requires more titrant to offset the change in pH due to the presence of the glass components). In turn, an inferior chemical durability generally corresponds to a greater degradation of the surface of the glass article and a greater concentration of alkali metal oxides within the salt bath used for ion exchange.

A low titrant volume and/or high chemical durability may be desired in strengthened glass articles. Generally, a titrant volume less than 1.5 mL is desired for Type I glasses. However, as described hereinabove, the presence of decomposition products, such as alkali hydroxides or alkali metal oxides, within a molten salt bath used for ion exchange may corrode and/or etch the surface of the glass article. This etching may result in increased titrant volumes, which correspond to a decrease in chemical durability. Typically, the titrant volume of a strengthened glass article will increase as a function of the time spent undergoing ion exchange. That is, the longer a glass article is contacted with a molten salt bath, the greater the titrant volume. For example, a glass article that undergoes ion exchange for approximately 3 hours may result in a titrant volume of approximately 0.9 mL while a glass article that undergoes ion exchange for approximately 10 hours may result in a titrant volume of approximately 1.1 mL.

Figure 2A:
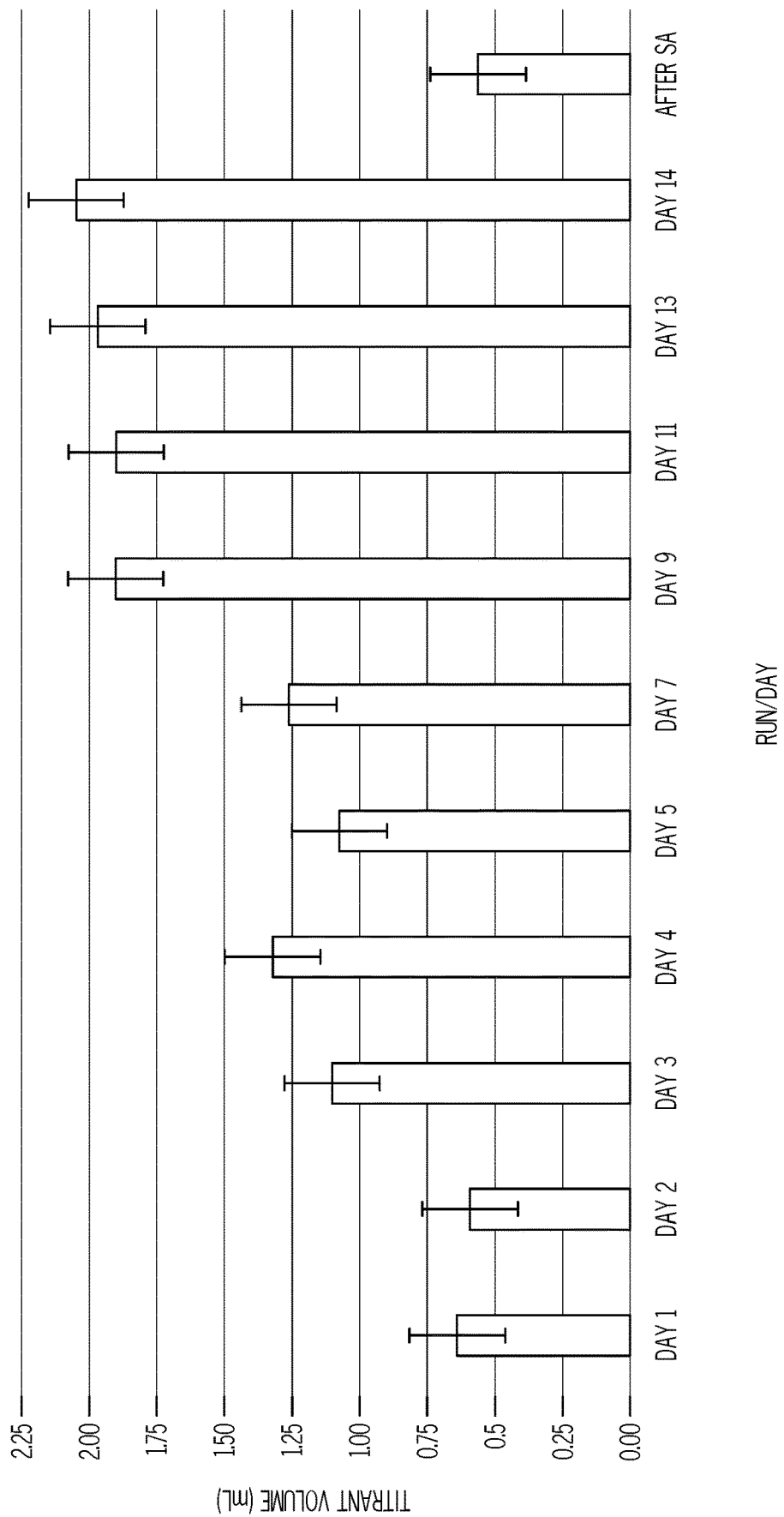
FIG. 2A graphically depicts the surface hydrolytic resistance (SHR) of glass articles which have undergone ion exchange, according to one or more embodiments shown and described herein.
Figure 2B:
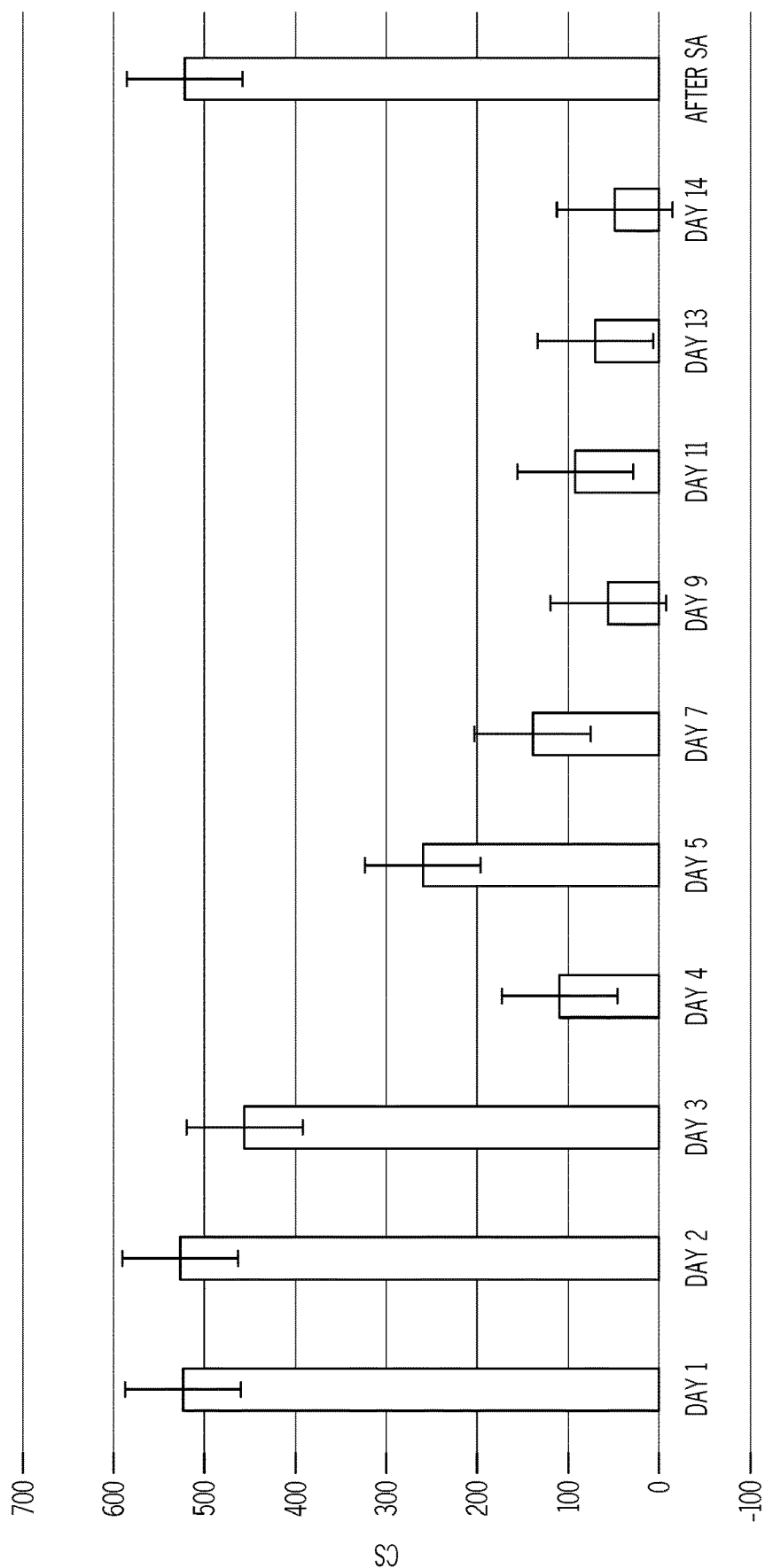
FIG. 2B graphically depicts the compressive stress (CS) of glass articles which have undergone ion exchange, according to one or more embodiments shown and described herein.
Figure 2C:
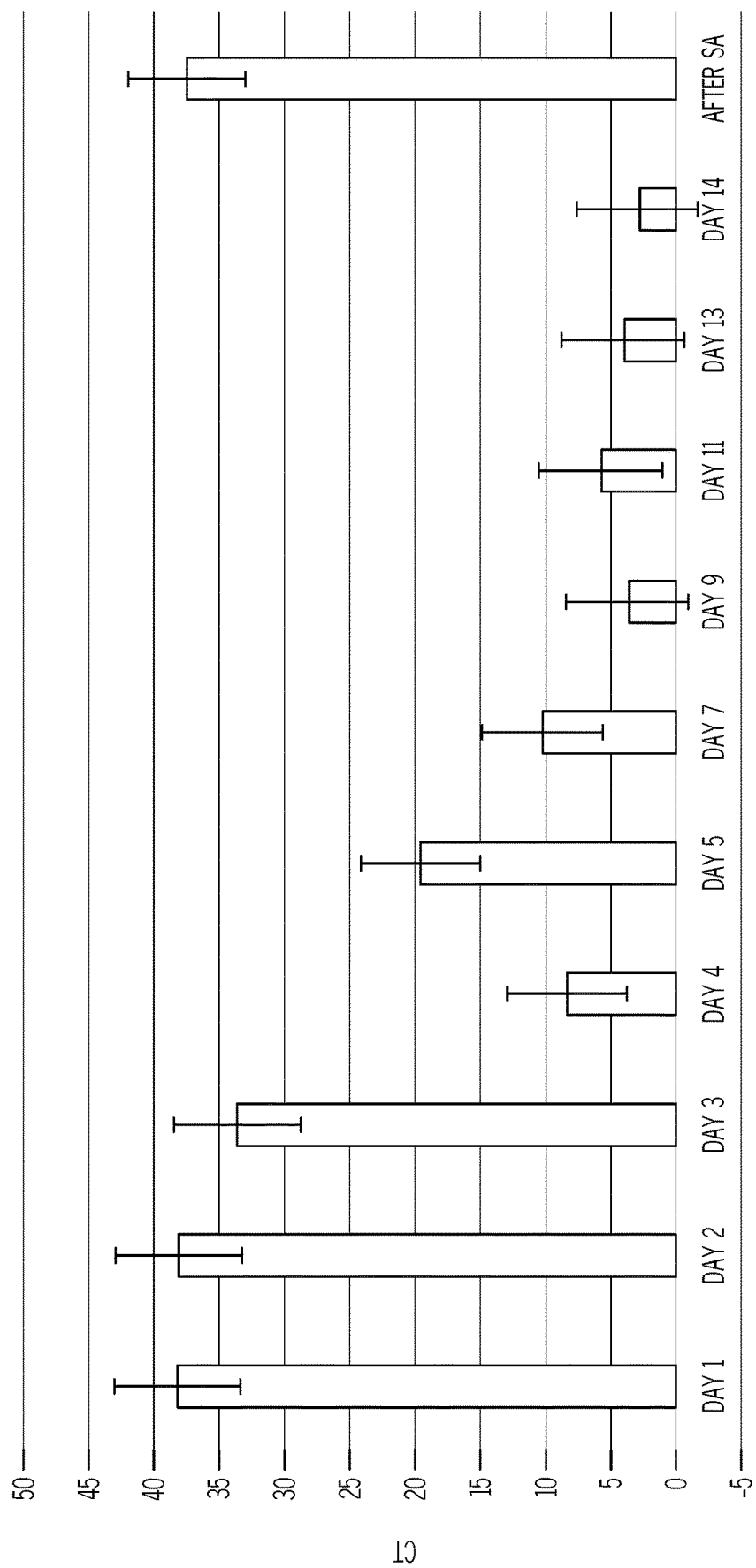
FIG. 2C graphically depicts the central tension (CT) of glass articles which have undergone ion exchange, according to one or more embodiments shown and described herein.
Figure 2D:
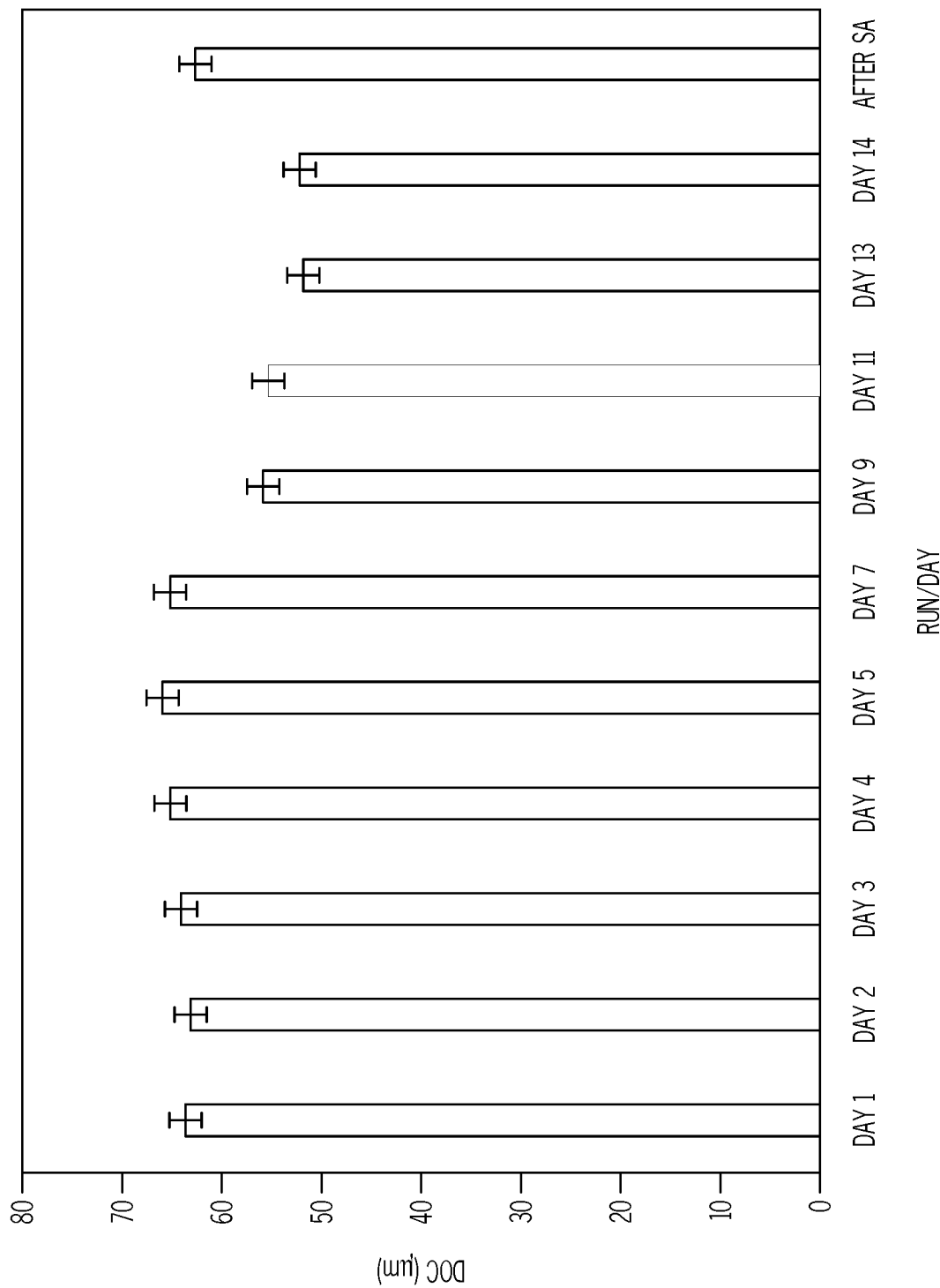
FIG. 2D graphically depicts the depth of compression (DOC) of glass articles which have undergone ion exchange, according to one or more embodiments shown and described herein.

Referring now to FIG. 2A, the volume of titrant per 100 mL of leachate (i.e., the titrant volume) and, by extension, the Surface Hydrolytic Resistance of glass articles that were ion exchanged in a molten salt bath is graphically depicted. As depicted in FIG. 2A, the titrant volume generally increased over the course of 14 days when no silicic acid was present, indicating the formation of alkali metal oxides within the molten salt bath and, as a result, the degradation of the surface of the glass articles. However, FIG. 2A also depicts that the addition of silicic acid (i.e., "After SA") significantly reduces the titrant volume to amounts less than or similar to the initial titrant volumes. That is, the inclusion of silicic acid in a salt bath composition or the addition of silicic acid to a molten salt bath has shown to be capable of effectively neutralizing molten salt baths. Similarly, referring now to FIG. 2B, the compressive stress (CS) of the glass articles steadily decreases over the course of 14 days. However, after the addition of silicic acid, the compressive stress achieved during the ion exchange process increases significantly and returns to the compressive stress values achieved with the molten salt bath was still fresh. This conclusion is further supported by FIGS. 2C-2D, which show that the central tension (CT) and depth of compression (DOC) of the strengthened glass articles increases significantly when silicic acid is added to a molten salt bath that has been used for multiple days.

However, it has been found that when the silicic acid particles have an average particle size that is too large, the silicic acid may fail to effectively neutralize the molten salt bath. In particular, it has been found that when the silicic acid particles have an average size that is too large the silicic acid particles may quickly sink to the bottom of the molten salt bath and, as a result, the probability of interactions and reactions between the silicic acid and the alkali metal oxides may be reduced. Accordingly, the average size of the silicic acid particles may be decreased in order to increase the buoyancy of the silicic acid particles within the molten salt bath and, as a result, decrease the rate at which the silicic acid particles settle within the molten salt bath.

Figure 3:
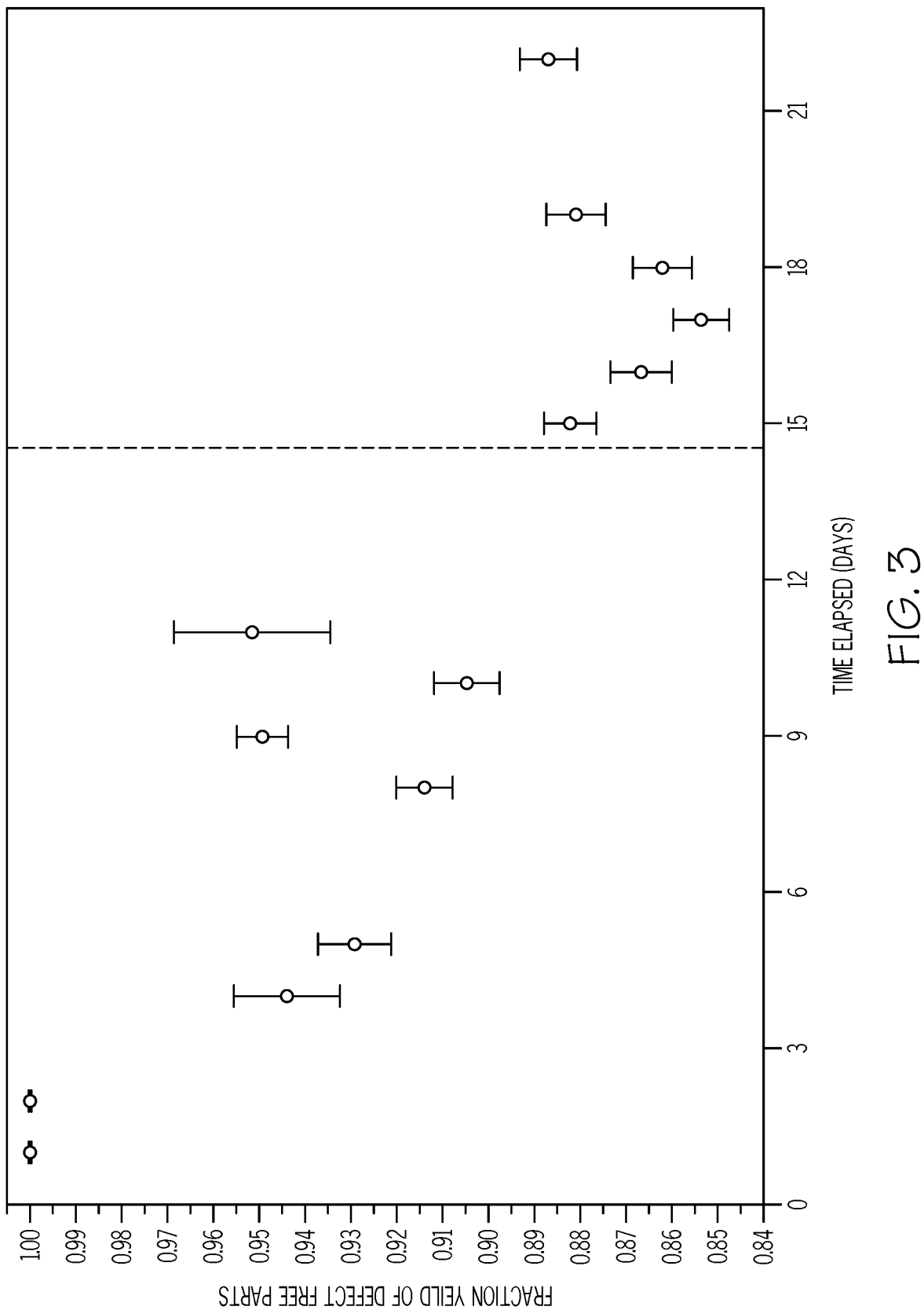
FIG. 3 graphically depicts the fraction yield of defect-free glass articles produced by an ion exchange process, according to one or more embodiments shown and described herein.

Conversely, it has been found that when the average particle size of the silicic acid particles is too small, the silicic acid particles may adhere to the surfaces of glass articles that are ion exchanged in the molten salt bath. This adhesion of silicic acid particles to the surfaces of the glass articles may result in defects that render the glass articles unsuitable for commercial use or, at least, require additional processing that increases production costs and reduces efficiency. For example, referring now to FIG. 3, the fraction yield of defect-free strengthened glass articles produced in a molten salt bath gradually decreases over time. However, after the addition of silicic acid (as indicated by the dashed line) the fraction yield of defect-free strengthened glass articles produced in the molten salt bath drastically decreases, indicating that the presence of silicic acid in the molten salt bath may negatively affect the quality of the glass articles strengthened therein.

Accordingly, the present disclosure is directed to salt bath compositions and salt bath systems for strengthening glass articles, and processes of strengthening glass articles that utilize silicic acid to effectively neutralize a molten salt bath while also reducing or preventing the adhesion of the silicic acid particles to the surfaces of glass articles that undergo ion exchange in the molten salt bath.

In embodiments, the salt bath composition may comprise one or more alkali metal salts. For example, the salt bath composition may comprise potassium nitrate ($KNO_3$), sodium nitrate ($NaNO_3$), lithium nitrate ($LiNO_3$), or combinations thereof. In embodiments, the salt bath composition may comprise from 90 wt. % to 99.9 wt. % of the one or more alkali metal salts based on the total weight of the salt bath composition. For example, the salt bath composition may comprise from 90 wt. % to 99.5 wt. %, from 90 wt. % to 99 wt. %, from 90 wt. % to 97 wt. %, from 90 wt. % to 95 wt. %, from 90 wt. % to 93 wt. %, from 93 wt. % to 99.9 wt. %, from 93 wt. % to 99.5 wt. %, from 93 wt. % to 99 wt. %, from 93 wt. % to 97 wt. %, from 93 wt. % to 95 wt. %, from 95 wt. % to 99.9 wt. %, from 95 wt. % to 99.5 wt. %, from 95 wt. % to 99 wt. %, from 95 wt. % to 97 wt. %, from 97 wt. % to 99.9 wt. %, from 97 wt. % to 99.5 wt. %, from 97 wt. % to 99 wt. %, from 99 wt. % to 99.9 wt. %, from 99 wt. % to 99.5 wt. %, or from 99.5 wt. % to 99.9 wt. % of the one or more alkali metal salts based on the total weight of the salt bath composition.

As noted hereinabove, the salt bath composition may comprise potassium nitrate, sodium nitrate, lithium nitrate, or combinations thereof. In embodiments, the salt bath composition may comprise from 5 wt. % to 99.9 wt. % potassium nitrate based on the total weight of the salt bath composition. For example, the salt bath composition may comprise from 5 wt. % to 75 wt. %, from 5 wt. % to 50 wt. %, from 5 wt. % to 25 wt. %, from 25 wt. % to 99.9 wt. %, from 25 wt. % to 75 wt. %, from 25 wt. % to 50 wt. %, from 50 wt. % to 99.9 wt. %, from 50 wt. % to 75 wt. %, or from 75 wt. % to 99.9 wt. % potassium nitrate based on the total weight of the salt bath composition. In embodiments, the salt bath composition may comprise from 5 wt. % to 99.9 wt. % sodium nitrate based on the total weight of the salt bath composition. For example, the salt bath composition may comprise from 5 wt. % to 75 wt. %, from 5 wt. % to 50 wt. %, from 5 wt. % to 25 wt. %, from 25 wt. % to 99.9 wt. %, from 25 wt. % to 75 wt. %, from 25 wt. % to 50 wt. %, from 50 wt. % to 99.9 wt. %, from 50 wt. % to 75 wt. %, or from 75 wt. % to 99.9 wt. % sodium nitrate based on the total weight of the salt bath composition. In embodiments, the concentrations of the alkali metal salts in the salt bath composition may be balanced based on the composition of the glass article to provide an ion exchange process that increases both the surface compressive stress at the surface of the glass article as well as the depth of compression after the ion exchange process. For example, the salt bath composition may comprise a greater concentration of potassium nitrate than sodium nitrate based on the total concentration of the salt bath composition, or the salt bath composition may comprise a greater concentration of sodium nitrate than potassium nitrate based on the total concentration of the salt bath composition. Without being bound by any particular theory, it is believed that a greater concentration of sodium nitrate than potassium nitrate in the salt bath composition, in conjunction with a longer residence time in the molten salt bath, may result in a deeper depth of compression in the glass article.

In embodiments, the salt bath composition may comprise silicic acid aggregates. As used herein, the term "silicic acid aggregate" may refer to a cluster or unit formed by the collection of silicic acid nanoparticles into a single mass. As described hereinabove, the silicic acid aggregates may react with the decomposition products of the one or more alkali metal salts in the salt bath composition to form an unreactive (e.g., does not etch or corrode the surface of the glass article) silicate and water. Accordingly, the silicic acid aggregates may reduce the concentration of the decomposition products of the alkali metal salts within the molten salt bath and, as a result, may increase the chemical durability of glass articles when compared to those subjected to ion exchange processes in conventional molten salt baths (i.e., molten salt baths that do not comprise silicic acid aggregates).

The salt bath composition may comprise an amount of silicic acid aggregates sufficient to effectively reduce the concentration of the at least one decomposition product within the molten salt bath. In embodiments, the salt bath composition may comprise from 0.1 wt. % to 10 wt. % silicic acid aggregates based on the total weight of the salt bath composition. For example, the salt bath composition may comprise from 0.1 wt. % to 7 wt. %, from 0.1 wt. % to 5 wt. %, from 0.1 wt. % to 3 wt. %, from 0.1 wt. % to 1 wt. %, from 0.1 wt. % to 0.5 wt. %, from 0.5 wt. % to 10 wt. %, from 0.5 wt. % to 7 wt. %, from 0.5 wt. % to 5 wt. %, from 0.5 wt. % to 3 wt. %, from 0.5 wt. % to 1 wt. %, from 1 wt. % to 10 wt. %, from 1 wt. % to 7 wt. %, from 1 wt. % to 5 wt. %, from 1 wt. % to 3 wt. %, from 3 wt. % to 10 wt. %, from 3 wt. % to 7 wt. %, from 3 wt. % to 5 wt. %, from 5 wt. % to 10 wt. %, from 5 wt. % to 7 wt. %, or from 7 wt. % to 10 wt. % silicic acid aggregates based on the total weight of the salt bath composition. When the salt bath composition includes fewer silicic acid aggregates (i.e., less than 0.1 wt. %), the availability of the silicic acid aggregates within the molten salt bath may not be sufficient to effectively interact with the decomposition products. In contrast, when the salt bath composition includes more silicic acid aggregates (i.e., greater than 10 wt. %), the excess silicic acid aggregates may interfere with the ion exchange process, such as adhering to and contaminating the surface of glass articles.

In embodiments, the silicic acid aggregates may have an average particle size of from 50 μm to 400 μm, as measured by laser diffraction particle size analysis. For example, the silicic acid aggregates may have an average particle size of from 50 μm to 350 μm, from 50 μm to 300 μm, from 50 μm to 250 μm, from 50 μm to 200 μm, from 200 μm to 400 μm, from 200 μm to 350 μm, from 200 μm to 300 μm, from 200 μm to 250 μm, from 250 μm to 400 μm, from 250 μm to 350

μm, from 250 μm to 300 μm, from 300 μm to 400 μm, from 300 μm to 350 μm, or from 350 μm to 400 μm, as measured by laser diffraction particle size analysis. In such embodiments, at least 50% of the silicic acid aggregates may have an average particle size less than 400 μm, as measured by laser diffraction particle size analysis. For example, at least 55%, at least 60%, at least 65%, at least 70%, at least 75%, at least 80%, or at least 85% of the silicic acid aggregates may have an average particle size less than 400 μm, as measured by laser diffraction particle size analysis. Furthermore, at least 50% of the silicic acid aggregates may have an average particle size less than 375 μm, less than 350 μm, less than 325 μm, less than 300 μm, less than 275 μm, less than 250 μm, less than 225 μm, less than 200 μm, or less than 175 μm, as measured by laser diffraction particle size analysis. Additionally, at least 50% of the silicic acid aggregates may have an average particle size greater than 50 μm, as measured by laser diffraction particle size analysis. For example, at least 55%, at least 60%, at least 65%, at least 70%, at least 75%, at least 80%, or at least 85% of the silicic acid aggregates may have an average particle size greater than 50 μm, as measured by laser diffraction particle size analysis. Furthermore, at least 50% of the silicic acid aggregates may have an average particle size greater than 175 μm, greater than 200 μm, greater than 225 μm, greater than 250 μm, greater than 275 μm, greater than 300 μm, greater than 325 μm, greater than 350 μm, or greater than 375 μm, as measured by laser diffraction particle size analysis. Without being bound by any particular theory, it is believed that silicic acid aggregates having a smaller average particle size (i.e., less than 50 μm) may readily adhere to the surface of glass articles and cause defects that render the glass article unsuitable for commercial use.

However, as mentioned hereinabove, silicic acid aggregates having a larger average particle size (i.e., greater than 200 μm) may fail to effectively neutralize the molten salt bath without some means of ensuring availability of the silicic acid aggregates within the molten salt bath. Accordingly, in embodiments the silicic acid aggregates may have an average particle size of from 50 μm to 200 μm, as measured by laser diffraction particle size analysis. For example, the silicic acid aggregates may have an average particle size of from 50 μm to 180 μm, from 50 μm to 160 μm, from 50 μm to 140 μm, from 50 μm to 120 μm, from 120 μm to 200 μm, from 120 μm to 180 μm, from 120 μm to 160 μm, from 120 μm to 140 μm, from 140 μm to 200 μm, from 140 μm to 180 μm, from 140 μm to 160 μm, from 160 μm to 200 μm, from 160 μm to 180 μm, or from 180 μm to 200 μm, as measured by laser diffraction particle size analysis. In embodiments, at least 50% of the silicic acid aggregates may have an average particle size less than 200 μm, as measured by laser diffraction particle size analysis. For example, at least 55%, at least 60%, at least 65%, at least 70%, at least 75%, at least 80%, or at least 85% of the silicic acid aggregates may have an average particle size less than 200 μm, as measured by laser diffraction particle size analysis. Furthermore, at least 50% of the silicic acid aggregates may have an average particle size less than 190 μm, less than 180 μm, less than 170 μm, less than 160 μm, less than 150 μm, less than 140 μm, less than 130 μm, less than 120 μm, or less than 110 μm, as measured by laser diffraction particle size analysis. In embodiments, at least 50% of the silicic acid aggregates may have an average particle size greater than 50 μm, as measured by laser diffraction particle size analysis. For example, at least 55%, at least 60%, at least 65%, at least 70%, at least 75%, at least 80%, or at least 85% of the silicic acid aggregates may have an average particle size greater than 50 μm, as measured by laser diffraction particle size analysis. Furthermore, at least 50% of the silicic acid aggregates may have an average particle size greater than 110 μm, greater than 120 μm, greater than 130 μm, greater than 140 μm, greater than 150 μm, greater than 160 μm, greater than 170 μm, greater than 180 μm, or greater than 190 μm, as measured by laser diffraction particle size analysis. Without being bound by any particular theory, it is believed that silicic acid aggregates having a larger average particle size (i.e., greater than 400 μm) may settle to the bottom of the salt bath tank too quickly and, as a result, fail to effectively interact with the decomposition products of the alkali metal salts.

In embodiments, the specific surface area of the silicic acid aggregates may be greater than or equal to 200 $m^2/g$, as measured by the Brunauer-Emmett-Teller (BET) method. For example, the specific surface area of the silicic acid aggregates may be from 200 $m^2/g$ to 600 $m^2/g$, from 200 $m^2/g$ to 550 $m^2/g$, from 200 $m^2/g$ to 500 $m^2/g$, from 200 $m^2/g$ to 450 $m^2/g$, from 200 $m^2/g$ to 400 $m^2/g$, from 200 $m^2/g$ to 350 $m^2/g$, from 200 $m^2/g$ to 300 $m^2/g$, from 200 $m^2/g$ to 250 $m^2/g$, from 250 $m^2/g$ to 600 $m^2/g$, from 250 $m^2/g$ to 550 $m^2/g$, from 250 $m^2/g$ to 500 $m^2/g$, from 250 $m^2/g$ to 450 $m^2/g$, from 250 $m^2/g$ to 400 $m^2/g$, from 250 $m^2/g$ to 350 $m^2/g$, from 250 $m^2/g$ to 300 $m^2/g$, from 300 $m^2/g$ to 600 $m^2/g$, from 300 $m^2/g$ to 550 $m^2/g$, from 300 $m^2/g$ to 500 $m^2/g$, from 300 $m^2/g$ to 450 $m^2/g$, from 300 $m^2/g$ to 400 $m^2/g$, from 300 $m^2/g$ to 350 $m^2/g$, from 350 $m^2/g$ to 600 $m^2/g$, from 350 $m^2/g$ to 550 $m^2/g$, from 350 $m^2/g$ to 500 $m^2/g$, from 350 $m^2/g$ to 450 $m^2/g$, from 350 $m^2/g$ to 400 $m^2/g$, from 400 $m^2/g$ to 600 $m^2/g$, from 400 $m^2/g$ to 550 $m^2/g$, from 400 $m^2/g$ to 500 $m^2/g$, from 400 $m^2/g$ to 450 $m^2/g$, from 450 $m^2/g$ to 600 $m^2/g$, from 450 $m^2/g$ to 550 $m^2/g$, from 450 $m^2/g$ to 500 $m^2/g$, from 500 $m^2/g$ to 600 $m^2/g$, from 500 $m^2/g$ to 550 $m^2/g$, or from 550 $m^2/g$ to 600 $m^2/g$. Without being bound by any particular theory, it is believed that the specific surface area of the silicic acid aggregates may directly correlate to the reaction rate constant (k) of the reaction between the silicic acid aggregates and the decomposition products of the alkali metal salts, as described herein. That is, the greater the specific surface area of the silicic acid aggregates, the greater the potential for reaction with the decomposition products present within the molten salt bath. This may allow for greater control over the properties of the salt bath composition and increased chemical durability of the glass article while using fewer silicic acid aggregates.

As noted hereinabove, the salt bath compositions of the present disclosure may be used to effectuate an ion exchange process, which exchanges alkali metal cations of a glass article with alkali metal cations of the alkali metal salts of the salt bath compositions. Accordingly, the salt bath compositions of the present disclosure may be used in salt bath systems or processes for strengthening glass articles.

Figure 4:
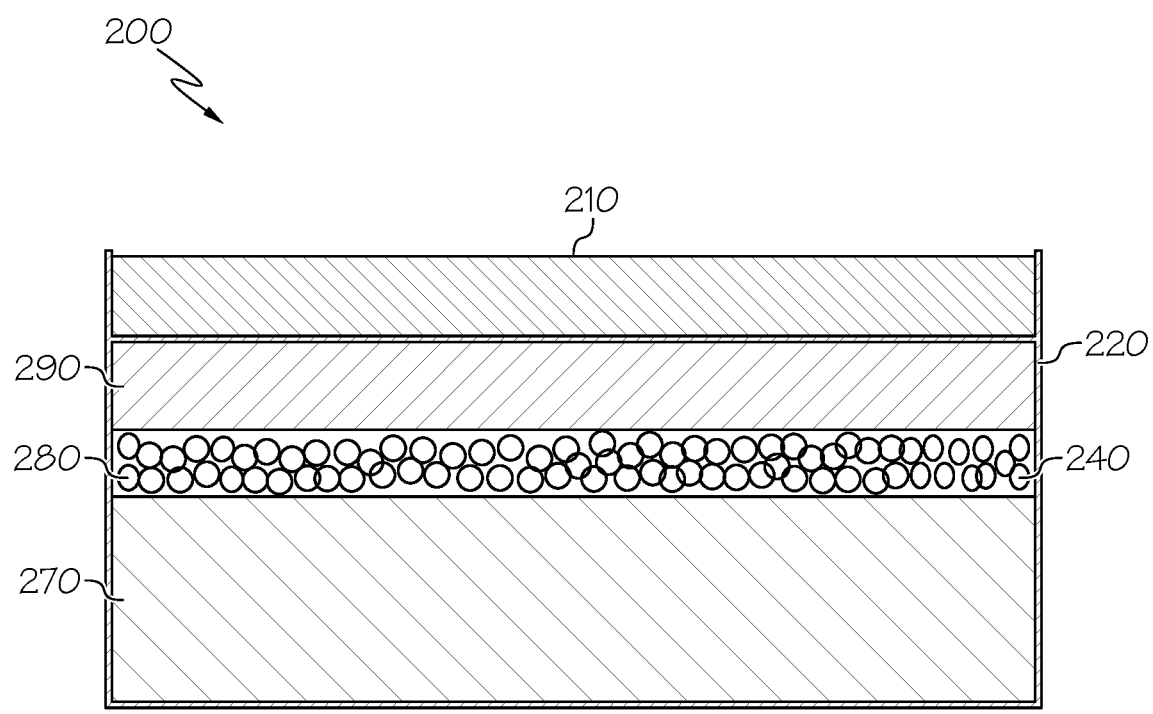
FIG. 4 schematically depicts a salt bath system, according to one or more embodiments shown and described herein.

In practice, the salt bath compositions of the present disclosure may first be loaded into a salt bath tank. Referring now to FIG. 4, a salt bath system 200 is generally depicted. In embodiments, the salt bath system 200 may comprise a salt bath tank 210, which generally defines an interior volume defined by at least one sidewall 220. The salt bath compositions of the present disclosure may generally be loaded into the salt bath tank 210 as a single composition or, alternatively, each component of the salt bath compositions (e.g., the alkali metal salts and the silicic acid aggregates) may be loaded into the salt bath tank 210 individually. That is, each component of a salt bath composition may be loaded into the salt bath tank 210 in individual layers. For example, as depicted in FIG. 4, the salt bath composition may be loaded into the salt bath tank 210 as a first solid layer 270, a second solid layer 280, and a third solid layer 290. That is, the first solid layer 270 may be added to the salt bath tank 210, then the second solid layer 280 may be added to the salt bath tank 210, and then the third solid layer 290 may be added to the salt bath tank 210 such that the second solid layer 280 is positioned between the first solid layer 270 and the third solid layer 290. It should be understood that any number of layers may be used when loading the salt bath composition into the salt bath tank 210. For example, in embodiments wherein the salt bath compositions comprise three different alkali metal salts and silicic acid aggregates, at least four layers (i.e., one for each component) may be used when loading the salt bath tank 210.

Referring still to FIG. 4, in embodiments the first solid layer 270 may comprise the one or more alkali metal salts of the salt bath composition. For example, the first solid layer 270 may comprise potassium nitrate, sodium nitrate, lithium nitrate, or combinations thereof. In embodiments, the first solid layer 270 may comprise greater than or equal to 90 wt. % of one or more alkali metal salts of the salt bath composition based on the total weight of the first solid layer 270. For example, the first solid layer 270 may comprise greater than or equal to 93 wt. %, greater than or equal to 95 wt. %, greater than or equal to 97 wt. %, greater than or equal to 99 wt. %, greater than or equal to 99.5 wt. %, or greater than or equal to 99.9 wt. % of one or more alkali metal salts of the salt bath composition based on the total weight of the first solid layer 270.

In embodiments, the second solid layer 280 may comprise the silicic acid aggregates 240 of the salt bath composition. Accordingly, the second solid layer 280 may comprise greater than or equal to 90 wt. % of the silicic acid aggregates 240 of the salt bath composition based on the total weight of the second solid layer 280. For example, the second solid layer 280 may comprise greater than or equal to 93 wt. %, greater than or equal to 95 wt. %, greater than or equal to 97 wt. %, greater than or equal to 99 wt. %, greater than or equal to 99.5 wt. %, or greater than or equal to 99.9 wt. % of the silicic acid aggregates of the salt bath composition based on the total weight of the second solid layer 280. In embodiments, the second solid layer 280 may comprise all or a substantial portion of the silicic acid aggregates 240 of the salt bath composition. That is, the second solid layer 280 may comprise greater than or equal to 90% of the silicic acid aggregates 240 of the salt bath composition. For example, the second solid layer 280 may comprise greater than or equal to 93%, greater than or equal to 95%, greater than or equal to 97%, greater than or equal to 99%, greater than or equal to 99.5%, or greater than or equal to 99.9% of the silicic acid aggregates 240 of the salt bath composition. Accordingly, the weight percent of the second solid layer 280 may be from 0.1 wt. % to 10 wt. % of the salt bath composition. For example, the weight percent of the second solid layer 280 may be from 0.1 wt. % to 7 wt. %, from 0.1 wt. % to 5 wt. %, from 0.1 wt. % to 3 wt. %, from 0.1 wt. % to 1 wt. %, from 0.1 wt. % to 0.5 wt. %, from 0.5 wt. % to 10 wt. %, from 0.5 wt. % to 7 wt. %, from 0.5 wt. % to 5 wt. %, from 0.5 wt. % to 3 wt. %, from 0.5 wt. % to 1 wt. %, from 1 wt. % to 10 wt. %, from 1 wt. % to 7 wt. %, from 1 wt. % to 5 wt. %, from 1 wt. % to 3 wt. %, from 3 wt. % to 10 wt. %, from 3 wt. % to 7 wt. %, from 3 wt. % to 5 wt. %, from 5 wt. % to 10 wt. %, from 5 wt. % to 7 wt. %, or from 7 wt. % to 10 wt. % of the salt bath composition.

In embodiments the third solid layer 290 may comprise one or more alkali metal salts of the salt bath composition. For example, the third solid layer 290 may comprise potassium nitrate, sodium nitrate, lithium nitrate, or combinations thereof. In embodiments, the third solid layer 290 may comprise greater than or equal to 90 wt. % of one or more alkali metal salts of the salt bath composition based on the total weight of the third solid layer 290. For example, the third solid layer 290 may comprise greater than or equal to 93 wt. %, greater than or equal to 95 wt. %, greater than or equal to 97 wt. %, greater than or equal to 99 wt. %, greater than or equal to 99.5 wt. %, or greater than or equal to 99.9 wt. % of one or more alkali metal salts of the salt bath composition based on the total weight of the third solid layer 290.

As noted hereinabove, in embodiments the first solid layer 270 and the third solid layer 290 may each comprise one or more alkali metal salts of the salt bath composition. In embodiments, the first solid layer 270 and the third solid layer 290 together may comprise all or a substantial portion of the one or more alkali metal salts of the salt bath composition. That is, the first solid layer 270 and the third solid layer 290 together may comprise greater than or equal to 90% of the one or more alkali metal salts of the salt bath composition. For example, the first solid layer 270 and the third solid layer 290 together may comprise greater than or equal to 93%, greater than or equal to 95%, greater than or equal to 97%, greater than or equal to 99%, greater than or equal to 99.5%, or greater than or equal to 99.9% of the one or more alkali metal salts of the salt bath composition. Accordingly, the sum of the weight percent of the first solid layer 270 and the third solid layer 290 may be from 90 wt. % to 99.5 wt. % of the salt bath composition. For example, the sum of the weight percent of the first solid layer 270 and the third solid layer 290 may be from 90 wt. % to 99.5 wt. %, from 90 wt. % to 99 wt. %, from 90 wt. % to 97 wt. %, from 90 wt. % to 95 wt. %, from 90 wt. % to 93 wt. %, from 93 wt. % to 99.9 wt. %, from 93 wt. % to 99.5 wt. %, from 93 wt. % to 99 wt. %, from 93 wt. % to 97 wt. %, from 93 wt. % to 95 wt. %, from 95 wt. % to 99.9 wt. %, from 95 wt. % to 99.5 wt. %, from 95 wt. % to 99 wt. %, from 95 wt. % to 97 wt. %, from 97 wt. % to 99.9 wt. %, from 97 wt. % to 99.5 wt. %, from 97 wt. % to 99 wt. %, from 99 wt. % to 99.9 wt. %, from 99 wt. % to 99.5 wt. %, or from 99.5 wt. % to 99.9 wt. % of the salt bath composition.

In embodiments, the ratio of the weight percent of the first solid layer 270 to the weight percent of the third solid layer 290 may be from 1:4 to 4:1. For example, the ratio of the weight percent of the first solid layer 270 to the weight percent of the third solid layer 290 may be from 1:4 to 3.5:1, from 1:4 to 3:1, from 1:4 to 2.5:1, from 1:4 to 2:1, from 1:4 to 1.5:1, from 1:4 to 1:1, from 1:4 to 1:2, from 1:2 to 4:1, from 1:2 to 3.5:1, from 1:2 to 3:1, from 1:2 to 2.5:1, from 1:2 to 2:1, from 1:2 to 1.5:1, from 1:2 to 1:1, from 1:1 to 4:1, from 1:1 to 3.5:1, from 1:1 to 3:1, from 1:1 to 2.5:1, from 1:1 to 2:1, from 1:1 to 1.5:1, from 1.5:1 to 4:1, from 1.5:1 to 3.5:1, from 1.5:1 to 3:1, from 1.5:1 to 2.5:1, from 1.5:1 to 2:1, from 2:1 to 4:1, from 2:1 to 3.5:1, from 2:1 to 3:1, from 2:1 to 2.5:1, from 2.5:1 to 4:1, from 2.5:1 to 3.5:1, from 2.5:1 to 3:1, from 3:1 to 4:1, from 3:1 to 3.5:1, or from 3.5:1 to 4:1.

Without being bound by any particular theory, it is believed that loading the salt bath tank in such a manner (e.g., adding a portion of the alkali metal salts, followed by the silicic acid aggregates, followed by the remaining alkali metal salts, each in a layered structure) before the salt bath composition has been heated to form a molten salt bath may result in a more effective incorporation of the silicic acid aggregates within the molten salt bath. For example, attempts to add the silicic acid aggregates to the salt bath tank after a molten salt bath has been formed may result in a variety of undesirable effects. In particular, the addition of the silicic acid aggregates to a molten salt bath may result in a substantial portion of the silicic acid remaining on the surface of the bath in a solid powder form for a period of time. This may result in an increased contamination of glass articles as they are removed from the molten salt bath during this period.

Once the salt bath composition (e.g., the first solid layer 270, the second solid layer 280, and the third solid layer 190) has been loaded into the salt bath tank 210, the salt bath composition may be heated to an elevated temperature (also referred to as an ion exchange temperature) sufficient to create a molten salt bath and thereby promote the ion exchange process. In embodiments, the salt bath composition may be heated to a temperature of from 350° C. to 500° C. For example, the salt bath composition may be heated to a temperature of from 350° C. to 475° C., from 350° C. to 450° C., from 350° C. to 425° C., from 350° C. to 400° C., from 350° C. to 375° C., from 375° C. to 500° C., from 375° C. to 475° C., from 375° C. to 450° C., from 375° C. to 425° C., from 375° C. to 400° C., from 400° C. to 500° C., from 400° C. to 475° C., from 400° C. to 450° C., from 400° C. to 425° C., from 425° C. to 500° C., from 425° C. to 475° C., from 425° C. to 450° C., from 450° C. to 500° C., from 450° C. to 475° C., or from 475° C. to 500° C. However, if the temperature of the molten salt bath is too high, it may be difficult to adequately control the ion exchange process and the rate of degradation of the alkali metal salts in the salt bath may increase.

Figure 5A:
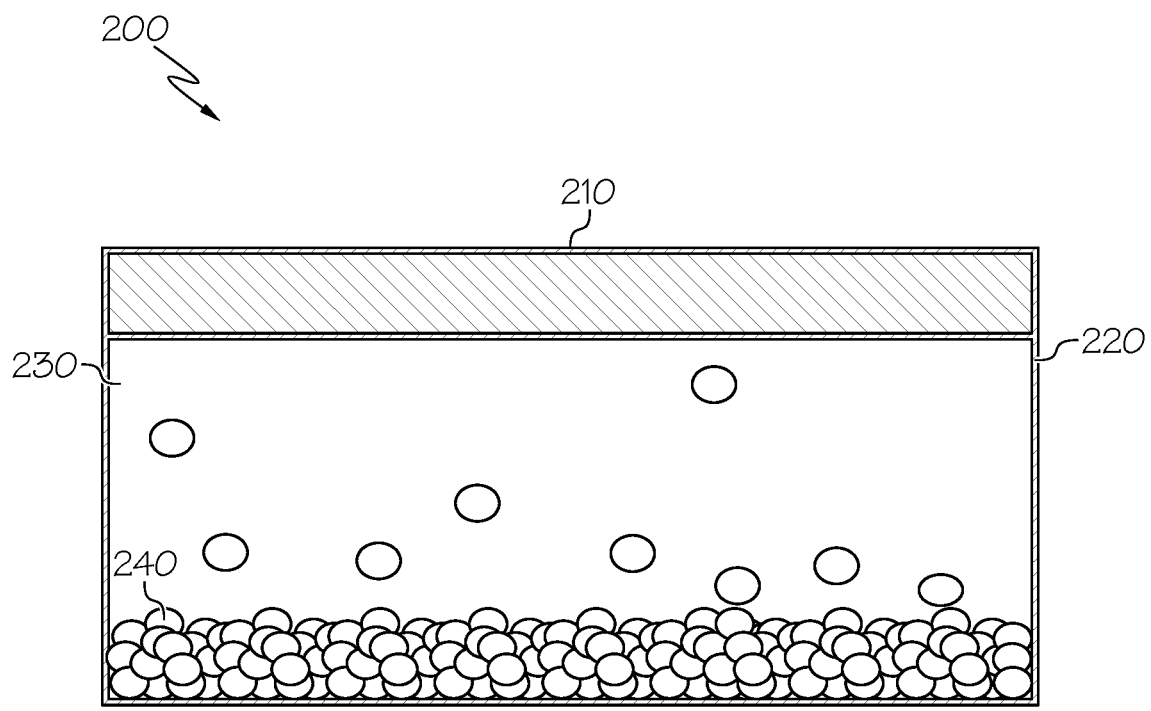
FIG. 5A schematically depicts a salt bath system, according to one or more embodiments shown and described herein.

As mentioned hereinabove, the silicic acid aggregates may be suspended within and, at varying rates, sink to the bottom of the molten salt bath. Referring now to FIG. 5A, the salt bath system 200 is generally depicted after the salt bath composition has been heated to an ion exchange temperature and a molten salt bath 230 has been formed. As shown in FIG. 5A, the silicic acid aggregates 240 may be dispersed throughout the molten salt bath 230, with a portion of the silicic acid aggregates suspended and a portion at the bottom of the molten salt bath 230. As mentioned hereinabove, silicic acid aggregates having a larger average particle size (i.e., greater than 400 µm) may settle to the bottom of the salt bath tank too quickly and, as a result, fail to effectively interact with the decomposition products of the alkali metal salts. Accordingly, in embodiments the salt bath system 200 may include one or more means to increase the availability of the silicic acid aggregates within the molten salt bath 230.

Figure 5B:
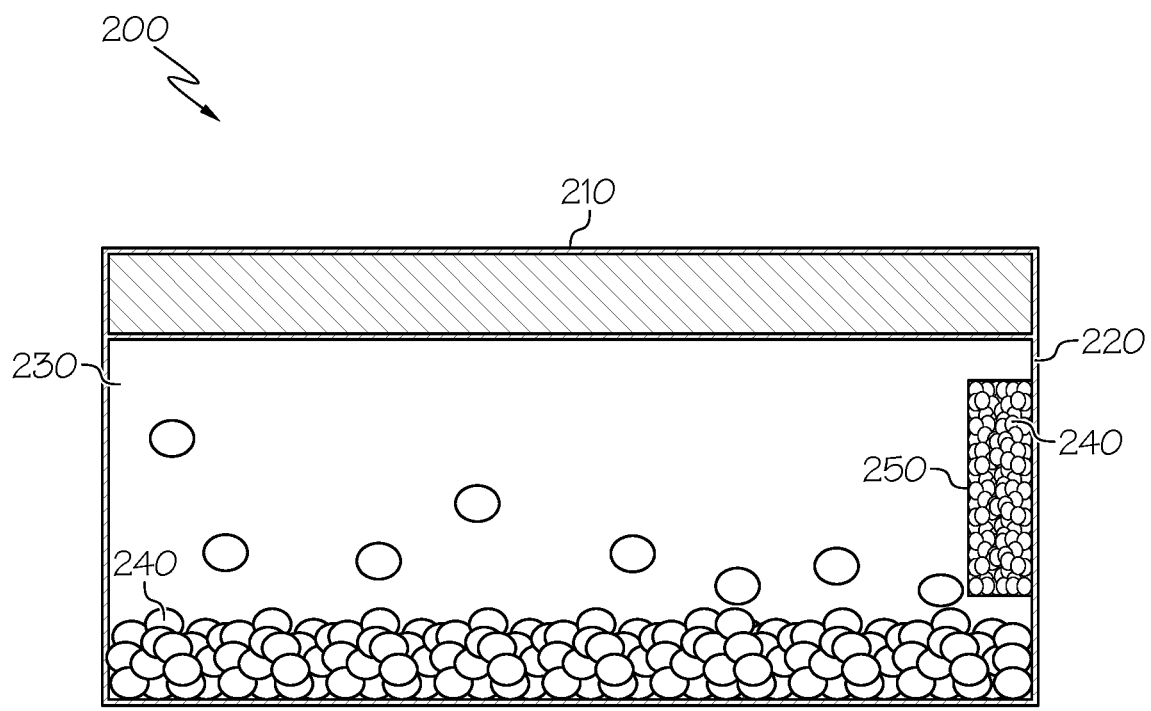
FIG. 5B schematically depicts a salt bath system, according to one or more embodiments shown and described herein.

For example, referring now to FIG. 5B, at least a portion of the silicic acid aggregates 240 may be contained within one or more sieves, such as sieve 250, which are coupled to the sidewall 220 of the salt bath tank 210. The sieves 250 may comprise an open, mesh structure which contains the silicic acid aggregates while also allowing molten salt to pass through the mesh and interact with the silicic acid aggregates. The sieves may allow the silicic acid aggregates to be dispersed at various locations in the molten salt bath 230, increasing the general availability of the silicic acid aggregates and allowing of more effective neutralization of the molten salt bath 230. These sieves may also prevent the silicic acid aggregates from sinking to the bottom of the molten salt bath 230 too quickly and, as a result, increase the probability of interactions between the silicic acid aggregates 240 and the decomposition products formed in the molten salt bath 230.

In embodiments, the sieve 250 may be composed of a mesh sufficient to allow the passage of the molten salt bath 230 through the sieve 250 while also preventing the silicic acid aggregates 240 from exiting the sieve 250. That is, the mesh has an average opening size less than the average particle size of the silicic acid aggregates contained within the sieve 250. As a result, the silicic acid aggregates 240 may be capable of effectively neutralizing the molten salt bath 230 while also avoiding contact with and the contamination of the surfaces of glass articles. Accordingly, the one or more sieves of the salt bath system 200, such as sieve 250, may have a mesh number greater than or equal to 70. For example, the one or more sieves of the salt bath system 200, such as sieve 250, may have a mesh number of 70, 80, 100, 120, 140, 170, 200, 230, 270, 325, 400, 450, 500, or 635, based on the American National Standard for Industrial Wire Cloth (American Standard ASTM-E11).

In embodiments, the one or more sieves of the salt bath system 200, such as sieve 250, may contain an amount of the silicic acid aggregates sufficient to effectively neutralize the molten salt bath 230. Accordingly, the portion of the silicic acid aggregates contained within the one or more sieves may comprise from 25% to 80% of the total amount of the silicic acid aggregates of the salt bath composition. For example, the portion of the silicic acid aggregates contained within the one or more sieves may comprise from 25% to 75%, from 25% to 65%, from 25% to 55%, from 25% to 45%, from 25% to 35%, from 35% to 80%, from 35% to 75%, from 35% to 65%, from 35% to 55%, from 35% to 45%, from 45% to 80%, from 45% to 75%, from 45% to 65%, from 45% to 55%, from 55% to 80%, from 55% to 75%, from 55% to 65%, from 65% to 80%, from 65% to 75%, or from 75% to 80% of the total amount of the silicic acid aggregates of the salt bath composition.

Figure 5C:
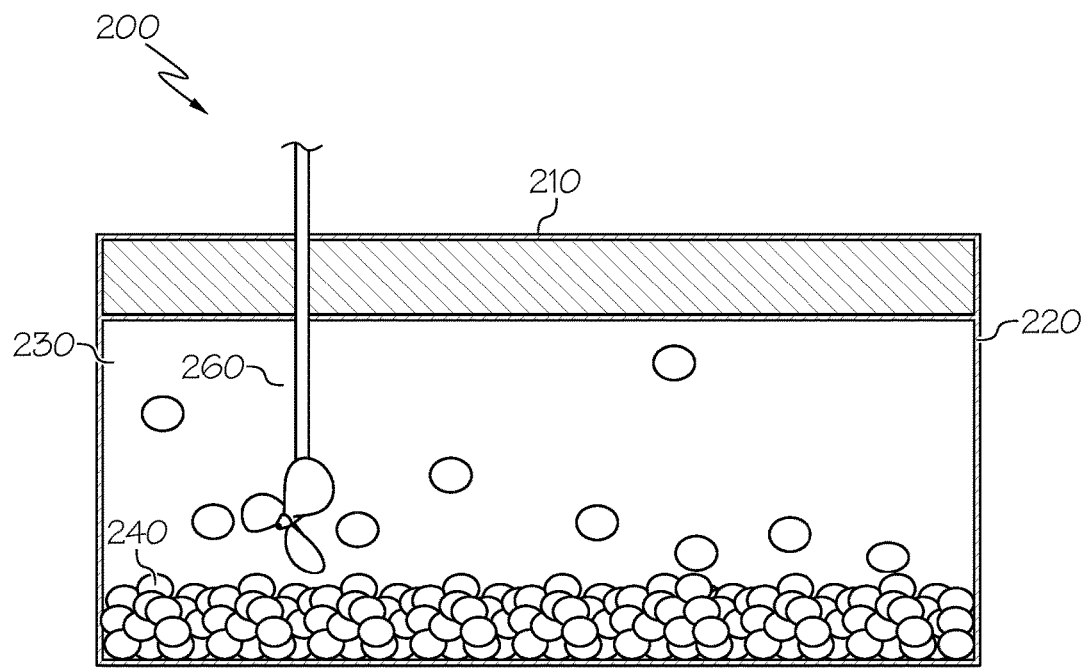
FIG. 5C schematically depicts a salt bath system, according to one or more embodiments shown and described herein.

Additionally or alternatively, the salt bath system 200 may include an agitator, such as a stirrer or a gas injection system, which is operable to circulate the molten salt bath 230 within the salt bath tank 210. Referring now to FIG. 5C, the salt bath system 200 may include a stirrer 260. The stirrer 260 may agitate the molten salt bath 230 and, in turn, cause the silicic acid aggregates 240 to rise from the bottom of the molten salt bath 230, or cause portions of the molten salt bath 230, including the decomposition products, to contact the silicic acid aggregates 240. As a result, such agitation may result in the effective neutralization of the molten salt bath 230 even in embodiments wherein the silicic acid aggregates having a larger average particle size (i.e., greater than 400 µm) that results in the silicic acid aggregates settling to the bottom of the salt bath tank too quickly.

Figure 6:
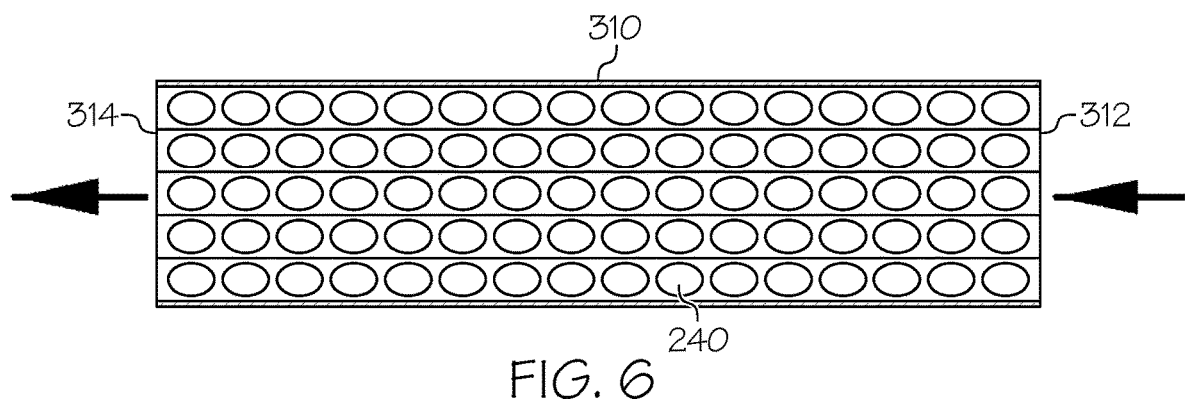
FIG. 6 schematically depicts a neutralization zone of a salt bath system, according to one or more embodiments shown and described herein.

In embodiments, rather than including the silicic acid aggregates within the salt bath composition, the molten salt bath may circulated through a neutralization zone comprising silicic acid aggregates. For example, the molten salt bath may be pumped or passed through a packed bed of silicic acid aggregates in order to neutralize the molten salt bath. Put more simply, the silicic acid aggregates may be used as a filter material to remove decomposition products from the molten salt bath between uses rather than actively reacting with the decomposition products within the salt bath tank. Referring now to FIG. 6, an example of a neutralization zone or packed bed of silicic acid aggregates is depicted. As shown in FIG. 6, the neutralization zone 310 may comprise a plurality of silicic acid aggregates 240 confined on either end by a first sieve 312 and a second sieve 314. A molten salt bath comprising decomposition products (e.g., a molten salt bath that has been used to strengthen one or more glass articles) may be passed through the neutralization zone 310 and, as a result, the decomposition products will contact and react with the silicic acid aggregates 240. For example, as indicated by the arrows in FIG. 6, the molten salt bath may enter the neutralization zone 310 by passing through the first sieve 312, contact the silicic acid aggregates 240, and exit the neutralization zone 310 by passing through the second sieve 314. This may result in the effective neutralization of the molten salt bath.

As mentioned hereinabove, the neutralization zone 310 may comprise a packed bed of silicic acid aggregates and, in embodiments, may be enclosed by one or more sieves, such as the first sieve 312 and the second sieve 314. In embodiments, the one or more sieves may be composed of a mesh sufficient to allow the passage of the molten salt bath through the sieve while also preventing the silicic acid aggregates 240 from exiting the neutralization zone 310. That is, the mesh may have an average opening size less than the average particle size of the silicic acid aggregates contained within the neutralization zone 310. Accordingly, the one or more sieves may have a mesh number greater than or equal to 70. For example, the one or more sieves may have a mesh number of 70, 80, 100, 120, 140, 170, 200, 230, 270, 325, 400, 450, 500, or 635, based on the American National Standard for Industrial Wire Cloth (American Standard ASTM-E11).

In embodiments, the molten salt bath may be circulated through the neutralization zone 310 at a rate sufficient to effectively neutralize the molten salt bath. Accordingly, the molten salt bath may be circulated through the neutralization zone 310 at a rate of from 0.05 vol/hr to 10 vol/hr. Put more simply, from 5% to 1000% of the total volume of the molten salt bath may be circulated through the neutralization zone 310 every hour. In embodiments, the molten salt bath may be circulated through the neutralization zone 310 at a rate of from 0.05 vol/hr to 8 vol/hr, from 0.05 vol/hr to 6 vol/hr, from 0.05 vol/hr to 4 vol/hr, from 0.05 vol/hr to 2 vol/hr, from 2 vol/hr to 10 vol/hr, from 2 vol/hr to 8 vol/hr, from 2 vol/hr to 6 vol/hr, from 2 vol/hr to 4 vol/hr, from 4 vol/hr to 10 vol/hr, from 4 vol/hr to 8 vol/hr, from 4 vol/hr to 6 vol/hr, from 6 vol/hr to 10 vol/hr, from 6 vol/hr to 8 vol/hr, or from 8 vol/hr to 10 vol/hr.

As mentioned hereinabove, after the salt bath composition has been heated to an ion exchange temperature to form a molten salt bath, and before or after any optional circulation or agitation has occurred, a glass articles may be submerged within the molten salt bath in order to effectuate an ion exchange between the molten salt bath and the glass article. The glass article may be contacted with the molten salt bath for a treatment time sufficient to create a surface compressive stress at the surface of the glass article that extends to a depth of compression. In embodiments, the glass article may be contacted with the molten salt bath for a treatment time of from about 20 minutes to about 20 hours. For example, the glass article may be contacted with the molten salt bath for a treatment time of from about 20 minutes to about 15 hours, from about 20 minutes to about 10 hours, from about 20 minutes to about 5 hours, from about 20 minutes to about 1 hour, from about 1 hour to about 20 hours, from about 1 hour to about 15 hours, from about 1 hour to about 10 hours, from about 1 hour to about 5 hours, from about 5 hours to about 20 hours, from about 5 hours to about 15 hours, from about 5 hours to about 10 hours, from about 10 hours to about 20 hours, from about 10 hours to about 15 hours, or from about 15 hours to about 20 hours.

In embodiments, the glass article is removed from contact with the molten salt bath after the ion exchange process. The resulting glass article, which has undergone ion exchange, may have a compressive stress at its surface that extends to a depth of compression. The compressive stress and depth of compression increase the resistance of the glass article to breakage following mechanical insults and, as a result, the glass article may be a strengthened glass article after the ion exchange process. However, due to the neutralization effect of the silicic acid aggregates, as described hereinabove, the strengthened glass article may retain or even exhibit improved chemical durability as indicated by the SHR titrant volume following ion exchange. As such, in embodiments the strengthened glass article may have a SHR titrant volume of less than 1.5 mL, less than or equal to 1.4 mL, less than or equal to 1.3 mL, less than or equal to 1.2 mL, less than or equal to 1.1 mL, less than or equal to 1 mL, less than or equal to 0.9 mL, less than or equal to 0.8 mL, less than or equal to 0.7 mL, less than or equal to 0.6 mL, less than or equal to 0.5 mL, less than or equal to 0.4 mL, less than or equal to 0.3 mL, less than or equal to 0.2 mL, or even less than or equal to 0.1 mL.

In embodiments, the strengthened glass article may be rinsed or washed after removal. Specifically, the ion exchange process may result in the deposit of alkali metal cations on the surface of the glass article, as described hereinabove. The ion exchange process may also result in the deposit of metal oxide nanoparticles on the surface of the glass article as well. The washing of the strengthened glass article may remove at least a portion of the alkali cations and/or the metal oxide nanoparticles. This may further prepare the glass article for desired applications, such as pharmaceutical packaging.

The glass articles subject to the ion exchange processes and salt bath compositions described herein may have various forms. For example, the glass articles may be glass plates, sheets, tubes, container or the like. In embodiments, the glass articles may be glass pharmaceutical packages or glass pharmaceutical containers for containing pharmaceutical compositions, such as liquids, powders and the like. For example, the glass articles described herein may be Vacutainers®, cartridges, syringes, ampoules, bottles, jars, flasks, phials, tubes, beakers, vials or the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A salt bath system for strengthening glass article, the salt bath system comprising:
   a molten salt bath tank defining an interior volume enclosed by at least one sidewall; and a salt bath composition within the interior volume and comprising:
   from 90 wt. % to 99.5 wt. % of one or more alkali or alkaline earth metal salts based on the total weight of the salt bath composition; and
   from 0.1 wt. % to 10 wt. % of silicic acid aggregates based on the total weight of the salt bath composition, wherein the silicic acid aggregates have an average size of from 50 μm to 400 μm.

2. The salt bath system of claim 1, wherein the system further comprises one or more sieves coupled to the sidewall, wherein at least a portion of the silicic acid aggregates are contained within the one or more sieves.

3. The salt bath system of claim 2, wherein the one or more sieves have a mesh number greater than or equal to 70.

4. The salt bath system of claim 2, wherein the portion of the silicic acid aggregates comprises from 25% to 80% of a total amount of the silicic acid aggregates.

5. The salt bath system of claim 1, wherein the system further comprises an agitator.

6. The salt bath system of claim 5, wherein the agitator comprises a stirrer.

7. The salt bath system of claim 5, wherein the agitator comprises a gas injection system.

8. The salt bath system of claim 1, wherein the silicic acid aggregates have an average size of from 50 μm to 200 μm.

9. The salt bath system of claim 1, wherein the silicic acid aggregates have an average size of from 200 μm to 400 μm.

10. The salt bath system of claim 1, wherein at least 50% of the silicic acid aggregates have an average size less than or equal to 400 μm.

11. The salt bath system of claim 1, wherein at least 50% of the silicic acid aggregates have an average size greater than or equal to 50 μm.

12. The salt bath system of claim 1, wherein an average surface area of the silicic acid aggregates is greater than or equal to 200 m$^2$/g.

13. The salt bath system of claim 1, wherein the one or more alkali metal salts comprise potassium nitrate, sodium nitrate, lithium nitrate, or combinations of these.

* * * * *